United States Patent [19]

Becker

[11] 4,065,707
[45] Dec. 27, 1977

[54] SAFETY MOTOR CONTROL MEANS FOR AN ELECTRICALLY DRIVEN MACHINE

[76] Inventor: Phillip R. Becker, 3830 Ironwood Place, Landover, Md. 20785

[21] Appl. No.: 641,775

[22] Filed: Dec. 17, 1975

[51] Int. Cl.² .............................................. H02P 1/22
[52] U.S. Cl. ..................................... 318/285; 318/283
[58] Field of Search ............... 318/280, 256, 284, 285, 318/283, 300; 192/.02 R, 129 A

[56] References Cited

U.S. PATENT DOCUMENTS

| | | | |
|---|---|---|---|
| 2,489,832 | 11/1949 | Symonds | 318/285 |
| 2,976,807 | 3/1961 | Hill | 318/285 |
| 3,259,824 | 7/1966 | Greenwald | 318/285 |

Primary Examiner—Robert K. Schaefer
Assistant Examiner—Eugene S. Indyk
Attorney, Agent, or Firm—George H. Mithcell, Jr.

[57] ABSTRACT

A machine for applying twine to a package, tying and severing the twine embodies a continuously operating electric drive motor and a mechanical clutch which is intermittently engaged by a machine operator utilizing a foot treadle. The mechanical clutch disengages following an operational cycle of the tying machine. Should the clutch be engaged when the machine is idle and should the motor subsequently be turned on, the tying mechanism is instantly activated creating a dangerous condition for the machine operator. The invention renders the machine safe under all conditions through the provision of a simplified electrical motor control device which assures a short duration reversal of the electric drive motor and associated mechanism sufficient to release the mechanical clutch and eliminate the safety hazard before the motor begins its normal continuous forward drive.

10 Claims, 12 Drawing Figures

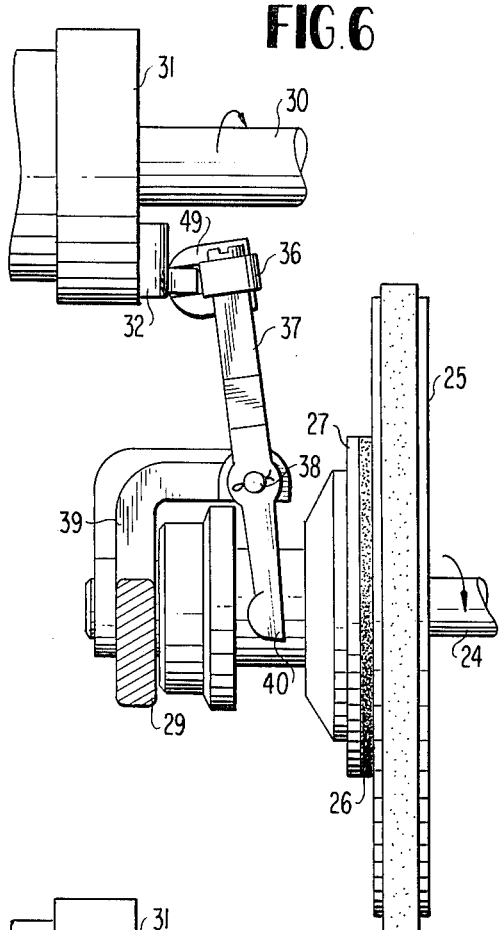
FIG. 6
FIG. 8
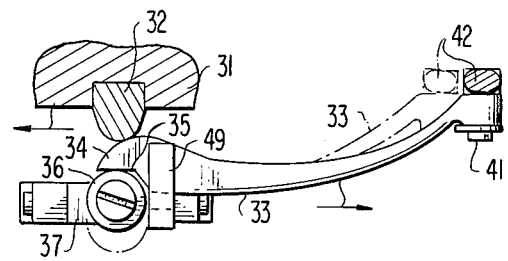
FIG. 7a
FIG. 7b
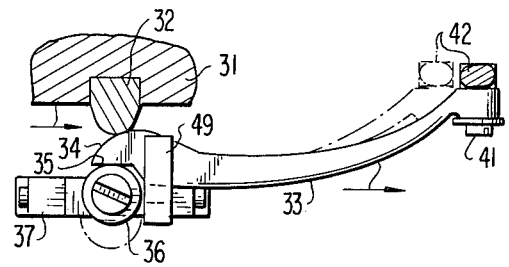
FIG. 9a
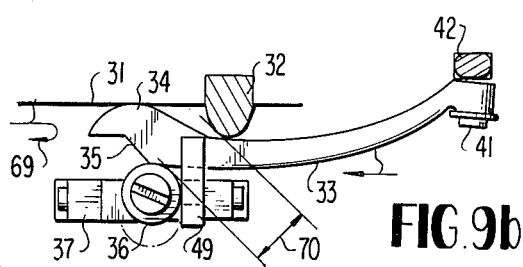
FIG. 9b
FIG. 9c

SAFETY MOTOR CONTROL MEANS FOR AN ELECTRICALLY DRIVEN MACHINE

BACKGROUND OF THE INVENTION

Package tying machines are well known in the prior art exemplified by U.S. Pat. Nos. 1,606,290; 1,994,453; 2,371,024 and others. Such prior art machines feature a constantly operating electric drive motor for the tying mechanism and intervening gearing including a mechanical clutch under control of a machine operator through a foot treadle. The mechanical clutch is only engaged when the operator depresses the treadle to start a package tying cycle of operation, as fully described in the above-noted prior patents. When the cycle of operation is completed, the clutch is automatically disengaged by driven release means to condition the machine for the next tying cycle.

A serious safety hazard arises with these prior art machines if someone depresses the foot treadle while the machine is idle and the electric drive motor is turned off. Such action will engage the mechanical clutch and when the electric drive motor is subsequently started up, the twine tying mechanism is instantly activated and could injure the operator or anyone else whose hands or arms might be at that moment in the path of the rapidly moving wrapping arm of the machine.

The present invention has arisen as a direct result of the necessity to deal with the above safety hazard in a completely effective, simple and economic manner, and in this sense the invention is an improvement on the known prior art. The invention completely solves the safety problem without any mechanical alteration of the machine structure which is extremely satisfactory for its intended purpose of tying bundles or packages of twine. More particularly, the invention solves the problem by means of a simplified and economical electrical motor control means which forms a compact attachment unit on the machine near the electric motor.

By means of this small motor control attachment, the mode of operation of the machine at start-up is modified to fully overcome the safety problem without any structural changes in the machine mechanism. The normal package tying mode of operation of the machine remains unaltered.

SUMMARY OF THE INVENTION

Briefly summarized, when the motor control means embodying the invention is present on the tying machine and assuming that the mechanical clutch has been manually engaged while the machine is idle with the drive motor turned off, the following sequence will occur. The operator will turn on the electric drive motor in the usual manner and due to the inclusion of the invention in the system, the polarity of power supplied to the drive motor is reversed and the motor is caused to run in a reverse mode initially compared to its normal forward rotation. This reverse operation continues for a sufficient time interval after which the motor is stopped and returned to its forward mode to deactivate the mechanical clutch, following which the motor is caused to operate in the normal forward mode throughout subsequent complete tying cycles. The invention is characterized by simplicity, reliability and economy. No other changes are required in the tying machine to completely overcome the safety hazard.

BRIEF DESCRIPTION OF DRAWINGS

FIG. 6 is a fragmentary elevational view similar to FIG. 3, but depicting the dangerous condition caused by clutch activation while the machine is idle followed by starting up of the electric drive motor while the clutch is engaged.

FIGS. 7a and 7b are views similar to FIG. 5 depicting relative positions of a rotating cam element, clutch fork and spring-urged clutch control lever during a rotational cycle of the cam in the normal forward direction.

FIG. 8 is a view similar to FIGS. 3 and 6 depicting reverse operation of the drive motor under influence of the invention.

FIGS. 9a, 9b and 9c are additional views similar to FIGS. 5, 7a and 7b depicting operation of the clutch disengaging means in accordance with the invention.

DETAILED DESCRIPTION

Figure 1:
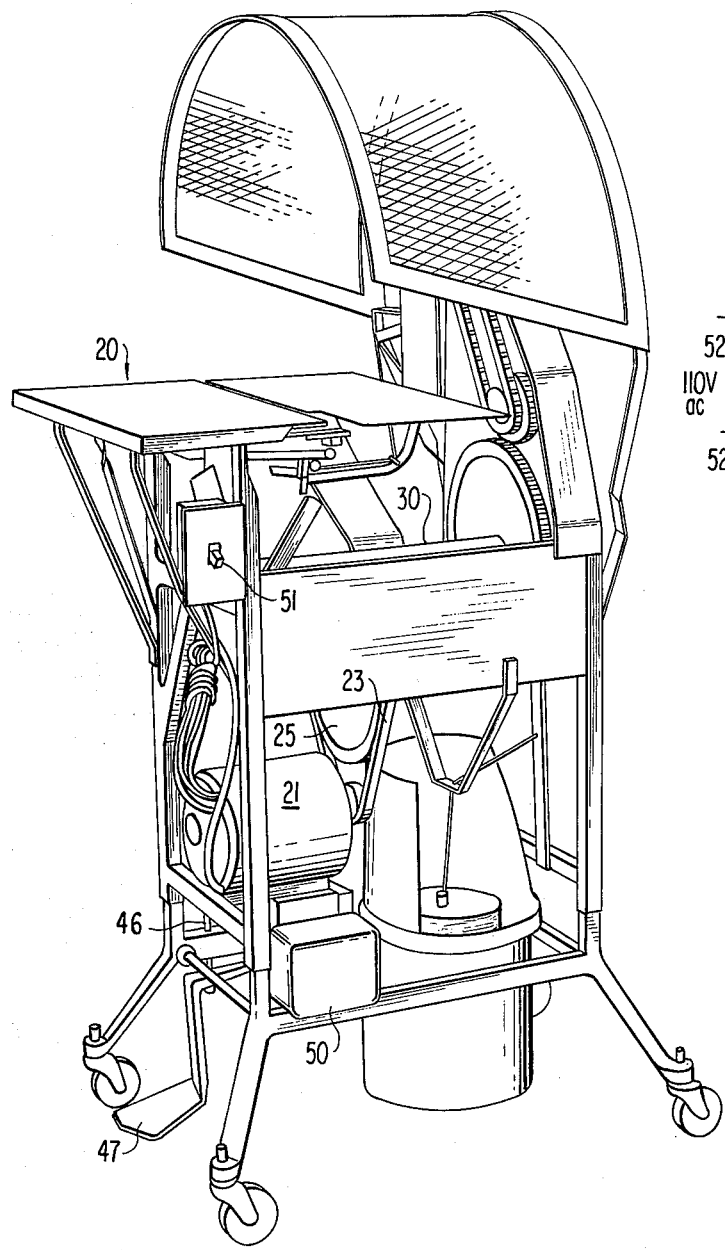
FIG. 1 is a perspective view of a package tying machine embodying the present invention.

Referring to the drawings in detail, wherein like numerals designate like parts throughout, and referring first to FIG. 1, the numeral 20 designates a package tying machine substantially as disclosed in previously-noted U.S. Pat. No. 1,606,290. Since the teachings of the patent are incorporated herein by reference, it is unnecessary to fully describe the package tying machine in this application and it will suffice to merely describe certain key elements of the machine whose operation is modified by the invention. More particularly, the package tying machine 20 embodies an electric drive motor 21 having an armature shaft 22 connected by belt drive means 23 with an overhead clutch shaft 24. The pulley 25 of belt drive means 23 carries a disc clutch facing 26 on one side thereof in opposing relationship to a shiftable clutch head 27 keyed to the shaft 24 as at 28 but free to shift axially on this shaft toward and away from engagement with the disc facing 26. The clutch elements 27 and 26 are biased toward engagement by a spring means, not shown, associated with the clutch head 27, as described in U.S. Pat. No. 1,606,290. A bearing support member 29 for the adjacent end of shaft 24 is provided in the machine structure.

A further overhead rotary shaft 30 geared to the shaft 24 carries a disc 31 having a cam or protrusion 32 thereon and revolving about the axis of shaft 30 during the operation of the machine. An associated clutch throw-out lever 33 has a curved head 34 in the path of movement of the cam element 32 and has a notch 35 on the far side of curved head 34 adapted at certain times to receive a roller 36 carried by the upper end of a clutch fork 37. The clutch fork 37 is pivotally mounted on a cross pin 38 carried by an extension 39 of the support member 29 in accordance with said prior patent. The bifurcated arms 40 of clutch fork 37 straddle the shiftable clutch head 27, as shown, whereby the pivoted fork at proper times may shift the head 27 out of engagement with the opposing clutch facing 26.

Figure 3:
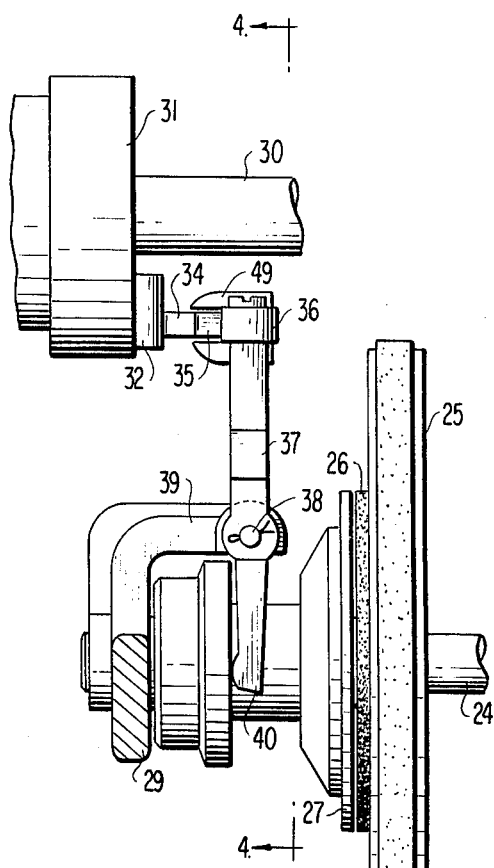
FIG. 3 is an enlarged fragmentary side elevational view of power transmission and clutch means utilized in the package tying machine.
Figure 4:
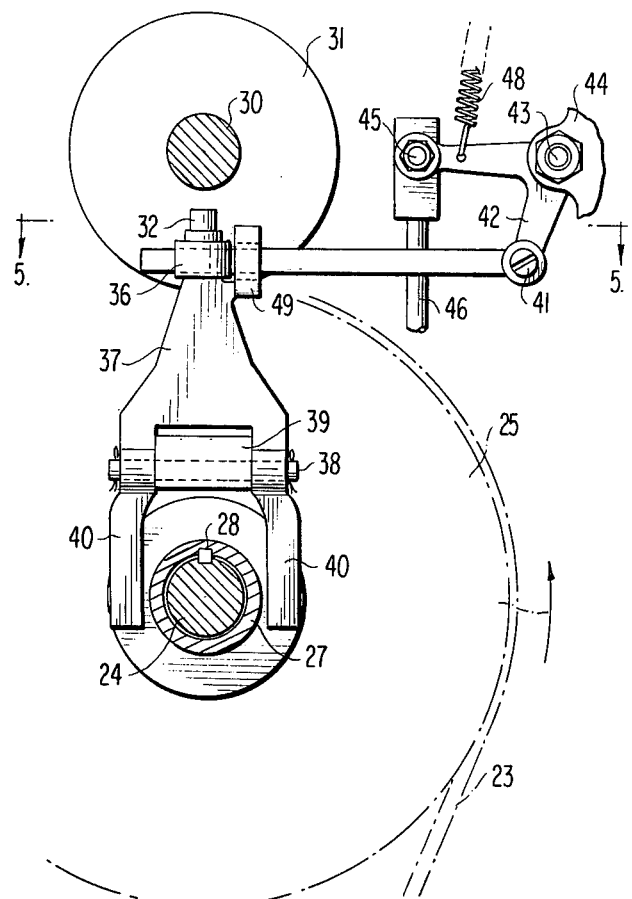
FIG. 4 is a fragmentary vertical section taken on line 4—4 of FIG. 3.

The clutch throw-out lever 33 has its end remote from the head 34 pivotally coupled at 41 with one arm of a bell crank lever 42 which in turn is pivoted at 43 to a stationary support member 44 of the machine. The second arm of bell crank lever 42 is pivotally attached at 45 to a shifter rod 46 which extends downwardly to a point near floor level, FIG. 1, and is there attached to a foot treadle 47 to be operated by a foot of the machine operator at proper times. As shown in FIG. 4, the bell crank lever 42 is biased by a spring 48 in a direction causing the clutch throw-out lever 33 to be normally urged to the clutch inactive or disengaged position corresponding to the arrangement in FIG. 3 where the two clutch elements 26 and 27 are separated. Depression of the treadle 47 against the force of spring 48 will turn the bell crank lever 42 in the direction shifting the throw-out lever 33 to the clutch activated or engaged position depicted in FIG. 6 where the elements 26 and 27 are frictionally engaged. A slotted guide and support element 49 on the top portion of clutch fork 37 near the roller 36 receives the unsupported end of lever 33 to stabilize it during operation.

All of the above construction is conventional and is disclosed in the referenced U.S. Pat. No. 1,606,290. The mode of operation of these machine elements under the invention in the package tying sequence remains unchanged and need not be further described.

Figure 2:
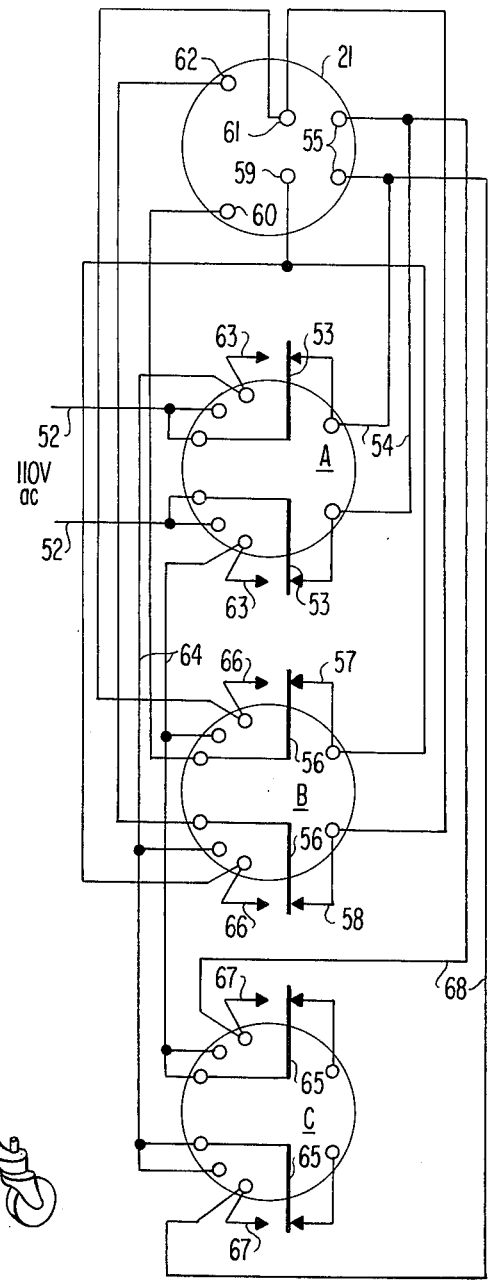
FIG. 2 is a wiring schematic of the motor control relay means utilized in the invention.

The invention proper, which modifies only the starting up operation of the machine in the interest of safety, as previously described, comprises a motor control relay device or means shown schematically in FIG. 2, and which means forms the only attachment to the basic tying machine 20 necessitated by the invention. Conveniently, the relay means of FIG. 2 may be contained in a small relay box 50, FIG. 1, mounted on the machine frame in the vicinity of the electric motor 21. The on-off switch 51 for the electric motor is preferably located at a convenient upper elevation on the machine in ready reach of the hand of the machine operator. No other machine attachments are involved in the invention and no structural modifications of any kind are necessitated to achieve the desired safe mode of operation in the starting up of the machine, as will be further described.

Referring to FIG. 2, the relay motor control means for the electric motor 21 is shown schematically. In this figure, time delay relay A is energized by direct connection with 110 volt AC power line 52 and current is supplied to movable contacts 53. Line 54 electrically connects movable contacts 53 with field winding terminals 55 of motor 21. Simultaneously, relay B is in a de-energized state wherein movable contacts 56 engage fixed contacts 57 and 58 to connect motor terminal 59 with terminal 60 and to also connect motor terminal 61 with terminal 62. The terminals 60 and 62 are the reversing terminals of the motor 21. Thus, the described arrangement causes the motor 21 to run in reverse or opposite to its normal running direction of armature shaft 22.

After the motor has run in reverse for a sufficient short time interval to back up and disengage the mechanical clutch, relay A switches contacts 53 over to fixed contacts 63 which cuts the power from line 52 to motor field terminals 55, causing the motor to begin slowing down. Simultaneously, contacts 63 connected with line 64 energize the reversing relay B and a time delay relay C, and also connect the contacts 65 of the latter relay with power supply line 52. Nothing happens immediately at relay C because contacts 65 are on an open circuit, but contacts 56 of relay B move over to fixed contacts 66 which reverses the motor connections so that terminal 60 is now electrically connected to terminal 61 and terminal 62 is connected to terminal 59. However, since the shifting of contacts 53 has disconnected the supply line 52 from the motor field terminals 55, the motor is still slowing down. After a time delay interval sufficient to allow the motor 21 to stop, movable contacts 65 of relay C, which have been on an open circuit shift to fixed contacts 67 which, through line 68, re-energizes the motor field 55, and because of the operation of reversing relay B, the motor now runs continuously in the normal forward direction to carry out the regular operation of the package tying machine.

Again referring to the other drawing figures, the mechanical mode of operation can be coordinated with the abovedescribed operation of the relay motor control means in the housing 50. Assuming that the machine 20 is idle and the electric motor 21 is turned off and during this interval someone has depressed the treadle 47 and pulled down rod 46 to turn bell crank 42 counterclockwise in FIG. 4 against the force of spring 48, the following will take place. The clutch throw-out lever 33 will be shifted to the right as shown by the arrow in FIG. 7a toward the full line position in that figure and away from its position in FIG. 4 where the mechanical clutch is disengaged with the facings 26 and 27 separated. This latter position of the lever 33 is shown in broken lines in FIG. 7a or corresponding to FIG. 4.

Assuming further that an operator of the tying machine 20 starts up the motor 21 by throwing the switch 51 to the "on" position, a dangerous condition will result, in the absence of the invention, because the mechanical clutch has been left in the engaged or active condition by depression of the treadle 47 while the motor 21 was "off." Therefore, when the motor starts up, the tying mechanism will instantly be activated and the unaware operator may have his or her hands or arms seriously injured.

Figure 5:
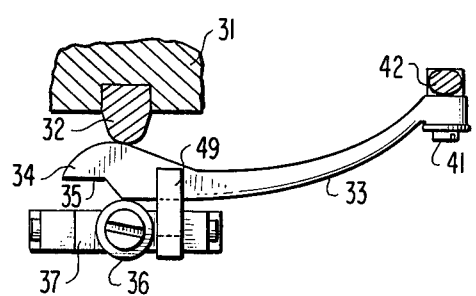
FIG. 5 is a fragmentary horizontal section taken on line 5—5 of FIG. 4.

This dangerous condition caused by starting up the motor 21 with the mechanical clutch facings 26 and 27 engaged is illustrated in FIGS. 6, 7a and 7b. The arrows in FIG. 6 indicate the normal directions of rotation of shafts 24 and 30 when the motor 21 is turned "on" without the presence of the invention. The arrows in FIGS. 7a and 7b indicate the corresponding normal direction of movement of the cam element 32 relative to clutch throw-out lever 33 which has been shifted previously by depression of the treadle 47. As shown in FIGS. 6 and 7a, the roller 36 has been allowed to enter the notch 35 of lever 33 under influence of the clutch engaging spring, not shown. With the mechanical clutch so engaged, the machine 20 instantly goes through the package tying cycle of operation with the attendant danger to the operator who may be unaware of the clutch being engaged while the machine was idle. Only after completion of the normal cycle of operation of the machine will the mechanical clutch be disengaged or rendered inactive. As shown in FIG. 7b, the throw-out lever 33 will have returned to its normal position of FIGS. 4 and 5 under influence of spring 48 and the lever will have ridden up on the roller 36 at the top of clutch fork 37, as shown. When the cam or protrusion 32 returns after a complete revolution with the disc 31, FIG. 7b, it will engage the lever head 34 and deactivate the mechanical clutch, the parts returning to their relative positions shown in FIGS. 3 to 5. All of this above operation relates to the prior art and is in the absence of the invention. As explained, the invention modifies the starting up cycle of operation of the machine so as to render it completely safe even when the clutch has been engaged while the machine is turned off.

FIGS. 8 through 9c depict the modified starting up operation with the clutch facings 26 and 27 engaged by someone stepping on the treadle 47 while the machine is off. Assuming now that someone turns on the motor 21 by means of switch 51 while the clutch is engaged, the already-described operation of the relay motor control means in FIG. 2 comes into play to render the system safe for the operator. As shown in FIGS. 8 through 9c, when the motor 21 is turned on while the clutch facings 26 and 27 are engaged, due to the action of the relay circuitry the motor armature shaft 22 and the associated shafts 24 and 30 will initially turn in reverse from their normal directions of rotation in the package tying cycle of the machine 20. This reverse operation will continue only for a sufficient time interval to place the cam 32 in the same position as it would normally occupy only when approaching the end of a complete tying cycle to accomplish deactivation of the mechanical clutch, after which the motor armature shaft 22 will stop and then start up in its regular forward drive to complete deactivation of the clutch as previously described (see FIG. 9c) and will run continuously in this manner, as described in U.S. Pat. No. 1,606,290. While so running, the operator may then engage the mechanical clutch at any time by stepping on treadle 47, and following this, the machine will complete the package tying cycle and the clutch will be thrown out automatically by the normal coaction of the elements 32, 33, 37, etc.

Still referring to FIGS. 8 through 9c, when the motor 21 starts up in reverse with the clutch engaged, the cam element 32 will be traveling oppositely from its regular movement as shown by the arrow and through immediate engagement with the lever head 34 will shift the lever 33 and clutch fork 37 so as to separate the clutch facings 26 and 27. After a relatively short time delay interval, the reverse operation of the motor 21 will stop in accordance with the described operation of the relay control means and then the motor armature shaft 22 will automatically start up in the regular forward mode as indicated by the arrow 69 in FIG. 9b. This return of operation of the motor to the forward mode will occur only after the space 70, FIG. 9b, between the elements 32 and 36 is sufficient to receive the relatively thick head portion of the clutch throw-out lever 33, this lever having returned to its regular position corresponding to FIG. 5 and under influence of spring 48 after release of treadle 47. Consequently, as depicted in FIG. 9c, continued forward movement of elements 31 and 32 relative to lever 33 will bring about engagement of the element 32 with head portion 34, and through roller 36 will shift clutch fork 37 in the direction of the arrow, FIG. 9c, to safely disengage the clutch automatically, when the motor 21 stops and then may be started up again in regular forward drive, all under control of the described relay means in FIG. 2.

In view of the modified start up mode for the machine, the safety hazard is completely removed even when the clutch has been engaged inadvertently or otherwise while the machine is idle. This is true because subsequent starting up of the machine causes initial reverse operation of the drive motor of sufficient duration to deactivate the clutch before the regular forward drive of the machine commences. Once the regular forward drive commences, the machine will operate exactly in the normal manner for carrying out the package tying procedure. The addition of the invention to the machine requires no structural changes thereof and does not adversely effect the machine in terms of its regular utility. The advantages of the invention in terms of safety achieved in an economical manner will now be apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a safety machanism for a machine of the type which comprises:
    a working mechanism to be operated intermittently by an electric drive motor running continuously in one direction to perform a predetermined cycle of operations;
    manual switch means to connect said drive motor to an electrical source;
    a mechanical clutch mechanism adapted to be engaged for transmitting motive power from said drive motor while running in said one direction to the working mechanism to initiate a cycle of said operations;
    said clutch mechanism including clutch release means actuated when the clutch is engaged and as a result of further rotation in said one direction to automatically disengage the clutch mechanism at the completion of a single cycle of said operations;
    said clutch mechanism including manual tripping means effective at any time to cause said clutch mechanism to become engaged, whether or not said drive motor is energized, and to remain engaged until said release means is actuated by said further rotation;
    the tripping of said clutch mechanism when said drive motor is deenergized creating a safety hazard when the motor is subsequently energized;
  the improvement comprising;
    automatic switching means connected between said manual switch means and said drive motor to;
      initially energize the motor for operation in the reverse direction to return the clutch mechanism to a condition normally existing prior to actuation of said release means;
      subsequently energize the motor for operation in said one direction to actuate said release means, and;
      continue energization of the motor for continuous operation in said one direction until deenergized by said manual switch means.

2. The structure of claim 1 in which said machine is a package tying machine and said working mechanism is a tying mechanism.

3. The structure of claim 1, and said automatic electric control means comprising a relay means electrically coupled between the switch means and the motor field winding.

4. The structure of claim 2, and wherein said automatic electric control means comprising a relay means electrically coupled between the switch means and the motor field winding.

5. The structure of claim 3, and said relay means additionally comprising a time delay relay electrically coupled between the switch means and the motor field winding, and a reversing relay electrically coupled with a pair of reversing terminals on the motor and being electrically connected with a pair of contacts of said time delay relay.

6. The structure of claim 5, and a second time delay relay electrically coupled with said motor field winding and electrically connected with terminals of said reversing relay.

7. The structure of claim 1, and said automatic electric control means for said drive motor comprising a first relay coupled between the switch means and a pair of motor field winding terminals, a reversing relay electrically coupled to reversing terminals of the motor and to the first-named relay, and a time delay relay electrically coupled to said field winding terminals of the motor and to terminals of said reversing and first-named relays.

8. The structure of claim 7, and each of said relays having a pair of moving contacts and cooperating pairs of stationary contacts.

9. The structure of claim 8, and one pair of stationary contacts of said first-named and time delay relays being electrically coupled to said motor field terminals, and the moving contacts of the reversing relay being electrically coupled to said motor reversing terminals.

10. The structure of claim 9, and the moving contacts of the first-named relay being electrically coupled to the switch means and one pair of stationary contacts of the first-named relay being electrically connected to terminals of the time delay relay.

* * * * *